(12) United States Patent
Han et al.

(10) Patent No.: US 12,744,034 B2
(45) Date of Patent: Sep. 22, 2026

(54) ELECTRONIC DEVICE AND CONTROL METHOD THEREOF

(71) Applicant: SAMSUNG ELECTRONICS CO., LTD., Suwon-si (KR)

(72) Inventors: Changwoo Han, Suwon-si (KR); Dokyun Lee, Suwon-si (KR); Jungwook Hwang, Suwon-si (KR); Jaeyoung Roh, Suwon-si (KR); Jonguk Yoo, Suwon-si (KR); Youngmoon Jung, Suwon-si (KR); Youngho Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 18/420,338

(22) Filed: Jan. 23, 2024

(65) Prior Publication Data

US 2024/0274128 A1 Aug. 15, 2024

Related U.S. Application Data

(63) Continuation of application No. PCT/KR2023/095125, filed on Dec. 19, 2023.

(30) Foreign Application Priority Data

Feb. 13, 2023 (KR) ........................ 10-2023-0018741

(51) Int. Cl.
*G10L 15/20* (2006.01)
*G06F 3/16* (2006.01)
(Continued)

(52) U.S. Cl.
CPC .............. *G10L 15/20* (2013.01); *G06F 3/167* (2013.01); *G10L 15/083* (2013.01); *G10L 15/22* (2013.01);
(Continued)

(58) Field of Classification Search
None
See application file for complete search history.

(56) References Cited

U.S. PATENT DOCUMENTS

| | | | |
|---|---|---|---|
| 9,747,926 | B2 | 8/2017 | Sharifi et al. |
| 10,553,219 | B2 | 2/2020 | Jung |

(Continued)

FOREIGN PATENT DOCUMENTS

| | | | |
|---|---|---|---|
| JP | 2019-191490 | A | 10/2019 |
| KP | 10-2021-0009596 | A | 1/2021 |

(Continued)

OTHER PUBLICATIONS

International Search Report dated Mar. 20, 2024, issued by the International Searching Authority in International Application No. PCT/KR2023/095125.

(Continued)

*Primary Examiner* — Jonathan C Kim
(74) *Attorney, Agent, or Firm* — Sughrue Mion, PLLC

(57) ABSTRACT

An electronic device includes a microphone; at least one memory storing a wake-up word detection model; and at least one processor configured to: obtain a sound signal received through the microphone, input the sound signal into the wake-up word detection model, obtain, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word, identify a first section of the sound signal, among the one or more sections of the sound signal, that corresponds to a first probability score, among the one or more first probability scores, that exceeds a first threshold value, and based on identifying a (Continued)

predetermined acoustic signal in the sound signal, reduce the first threshold value.

14 Claims, 10 Drawing Sheets

(51) Int. Cl.
*G10L 15/08* (2006.01)
*G10L 15/22* (2006.01)
(52) U.S. Cl.
CPC .. *G10L 2015/088* (2013.01); *G10L 2015/223* (2013.01)

(56) References Cited

U.S. PATENT DOCUMENTS 10,978,058 B2 4/2021 Yoo et al.
11,328,721 B2 5/2022 Yang et al.
11,417,327 B2 8/2022 Choi
11,423,878 B2 8/2022 Lee et al.
11,636,867 B2 4/2023 Woo et al.
2011/0218952 A1* 9/2011 Mitchell ................. G10L 15/02 706/12
2015/0340029 A1* 11/2015 Kunieda ............... G10L 15/083 704/249
2019/0096398 A1 3/2019 Sereshki
2019/0172451 A1* 6/2019 Yoo ....................... G06F 1/3265
2020/0090646 A1* 3/2020 Smith ..................... G10L 15/22
2020/0118544 A1 4/2020 Lee et al.
2020/0152205 A1* 5/2020 Sayyadi-Harikandehei ................ G06F 21/32
2020/0168223 A1 5/2020 Choi
2020/0388273 A1* 12/2020 Fu ........................... G10L 15/18
2021/0016431 A1* 1/2021 Kim ....................... B25J 9/0003
2021/0110837 A1 4/2021 Woo et al.
2021/0193145 A1* 6/2021 Smith ..................... G10L 15/22
2021/0390948 A1* 12/2021 Shah ....................... G10L 15/08
2022/0165277 A1 5/2022 Kracun et al.
2022/0180862 A1* 6/2022 Sharifi .................... G10L 15/04
2023/0154470 A1 5/2023 Yang et al.
2024/0038239 A1* 2/2024 Sayyadi .................. G10L 15/22
2024/0274128 A1* 8/2024 Han ........................ G10L 15/22

FOREIGN PATENT DOCUMENTS

KR 10-2093851 B1 3/2020
KR 10-2020-0063521 A 6/2020
KR 10-2021-0044509 A 4/2021
KR 10-2021-0074974 A 6/2021
KR 10-2022-0111574 A 8/2022

OTHER PUBLICATIONS

Written Opinion dated Mar. 20, 2024, issued by the International Searching Authority in International Application No. PCT/KR2023/095125.

* cited by examiner

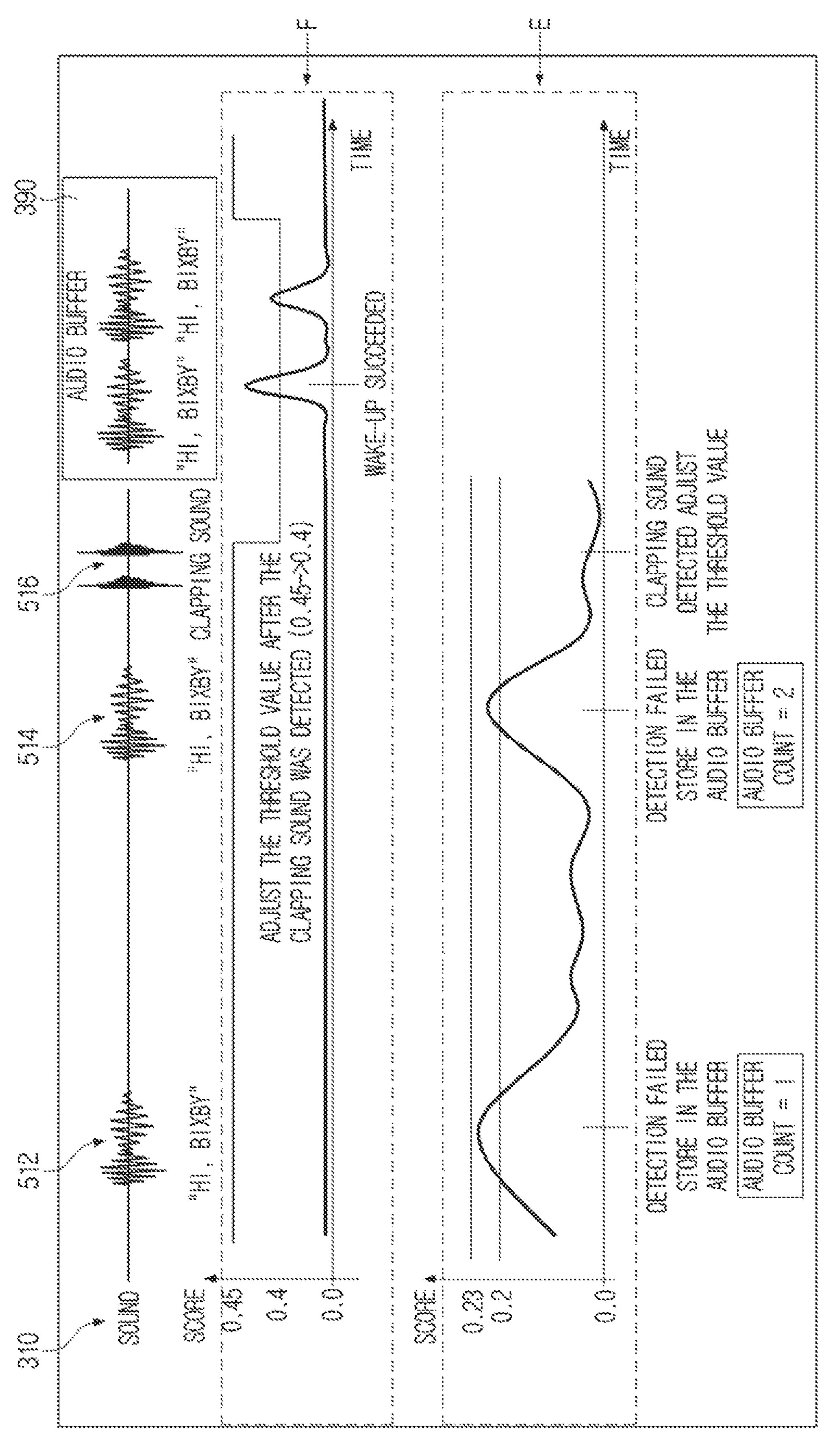
FIG. 5B
310
SOUND
SCORE
0.45
0.4
0.0
512
"HI, BIXBY"
514
"HI, BIXBY" CLAPPING SOUND
516
390
AUDIO BUFFER
"HI, BIXBY" "HI, BIXBY"
ADJUST THE THRESHOLD VALUE AFTER THE CLAPPING SOUND WAS DETECTED (0.45->0.4)
WAKE-UP SUCCEEDED
TIME
F
E
SCORE
0.23
0.2
0.0
TIME
DETECTION FAILED STORE IN THE AUDIO BUFFER
AUDIO BUFFER COUNT = 1
DETECTION FAILED STORE IN THE AUDIO BUFFER
AUDIO BUFFER COUNT = 2
CLAPPING SOUND DETECTED ADJUST THE THRESHOLD VALUE

ELECTRONIC DEVICE AND CONTROL METHOD THEREOF

CROSS-REFERENCE TO RELATED APPLICATION

This application is a bypass continuation of International Application No. PCT/KR2023/095125, filed on Dec. 19, 2023, which is based on and claims priority to Korean Patent Application No. 10-2023-0018741, filed on Feb. 13, 2023, in the Korean Intellectual Property Office, the disclosures of which are incorporated by reference herein in their entireties.

BACKGROUND

1. Field

The disclosure relates to an electronic device and a control method thereof, and more particularly, to an electronic device on which a function related to voice recognition is mounted, and a control method thereof.

2. Description of Related Art

As electronic technologies are developing, electronic devices provided with a voice recognition function are being developed widely. Users may activate a voice recognition function of electronic devices by uttering a wake-up word (in other words, a call word, a keyword, a trigger word, etc.).

In various noise environments, there may be a limitation on activation of a voice recognition function through an utterance of a wake-up word. That is, due to ambient noises, even if a user repeatedly utters a wake-up word, the voice recognition function may not be activated. In this case, there is inconvenience that the user has to activate the voice recognition function manually by using other means (e.g., a button, etc.), or utter the wake-up word more loudly.

Accordingly, there is a rising need for a technology that enables securing of performance related to activation of a voice recognition function through a user utterance even in a noise environment.

SUMMARY

According to an aspect of the disclosure, an electronic device includes: a microphone; at least one memory storing a wake-up word detection model; and at least one processor configured to: obtain a sound signal received through the microphone, input the sound signal into the wake-up word detection model, obtain, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word, identify a first section of the sound signal, among the one or more sections of the sound signal, that corresponds to a first probability score, among the one or more first probability scores, that exceeds a first threshold value, and based on identifying a predetermined acoustic signal in the sound signal, reduce the first threshold value.

The at least one processor may be further configured to, based on identifying the first section of the sound signal, execute a function corresponding to voice recognition.

The at least one memory stores a wake-up word verification model, and the at least one processor may be further configured to: based on identifying the first section of the sound signal, input the first section of the sound signal into the wake-up word verification model, and obtain, as an output of the wake-up word verification model, a second probability score corresponding to the first section of the sound signal and representing a probability that the first section of the sound signal corresponds to a wake-up word, based on the second probability score corresponding to the first section of the sound signal exceeding a second threshold value, execute a function corresponding to voice recognition, and based on identifying the predetermined acoustic signal in the sound signal, reduce the second threshold value.

The predetermined acoustic signal may include at least one of a clapping sound or a whistle sound, the at least one memory stores a sound event detection model, and the at least one processor may be further configured to: input the sound signal into the sound event detection model, obtain, as an output of the sound event detection model, one or more third probability scores corresponding to one or more sections of the sound signal, wherein each third probability score of the one or more third probability scores represents a probability that a corresponding section of the one or more sections of the sound signal corresponds to the predetermined acoustic signal, and identify as the predetermined acoustic signal a section of the sound signal, among the one or more sections of the sound signal, that corresponds to a third probability score, among the one or more third probability scores, that exceeds a third threshold value.

The at least one processor may be further configured to: based on identifying the predetermined acoustic signal: identify a second section of the sound signal corresponding to a first probability score, among the one or more first probability scores, that exceeds a fourth threshold value, and input the second section of the sound signal into the wake-up word verification model, obtain, as an output of the wake-up word verification model, a second probability score corresponding to the second section of the sound signal representing a probability that the second section of the sound signal corresponds to a wake-up word, and based on the second probability score corresponding to the second section of the sound signal exceeding a fifth threshold value, execute the function corresponding to voice recognition, and the fourth threshold value is smaller than the first threshold value, and the fifth threshold value is smaller than the second threshold value.

The at least one processor may be further configured to, based on the function corresponding to voice recognition being executed based on the second probability score corresponding to the second section of the sound signal exceeding the fifth threshold value, restore the fourth threshold value and the fifth threshold value respectively to the first threshold value and the second threshold value.

The at least one processor may be further configured to: identify a third section of the sound signal corresponding to a first probability score among the one or more first probability scores with a value between the first threshold value and a sixth threshold value, based on identifying the third section of the sound signal, store the third section of the sound signal in the at least one memory, and based on identifying the predetermined acoustic signal and storing the third section of the sound signal in the at least one memory: input the third section of the sound signal into the wake-up word verification model, obtain, as an output of the wake-up word verification model, a second probability score corresponding to the third section of the sound signal and representing a probability that the third section of the sound signal corresponds to a wake-up word, and based on the second probability score for the third section of the sound signal exceeding a fifth threshold value, execute the function corresponding to voice recognition, and the fifth threshold value is smaller than the second threshold value.

The at least one processor may be further configured to, based on identifying a first plurality of sections of the sound signal respectively corresponding to a first plurality of first probability scores, among the one or more first probability scores, with values between the first threshold value and the sixth threshold value, input the first plurality of sections of the sound signal into the wake-up word verification model.

The at least one processor may be further configured to, based on the function corresponding to voice recognition being executed based on the second probability score corresponding to the third section of the sound signal exceeding the fifth threshold value, delete the third section of the sound signal from the at least one memory, and restore the fifth threshold value to the second threshold value.

The at least one processor may be further configured to analyze the sound signal and obtain a noise level, and determine a degree of adjustment according to the noise level.

The at least one processor may be further configured to, based on a predetermined time passing after the predetermined acoustic signal is identified, reverse the reduction of the first threshold value.

According to an aspect of the disclosure, a method of controlling an electronic device, includes: inputting a sound signal received through a microphone into a wake-up word detection model; obtaining, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word; identifying a first section of the sound signal, among the one or more sections of the sound signal, that corresponds to a first probability score, among the one or more first probability scores, that exceeds a first threshold value; and based on identifying the first section of the sound signal, executing a function corresponding to voice recognition.

The method may further include, based on identifying a predetermined acoustic signal in the sound signal, reducing the first threshold value.

The executing the function corresponding to voice recognition may include: inputting the first section of the sound signal into a wake-up word verification model; obtaining, as an output of the wake-up word verification model, a second probability score corresponding to the first section of the sound signal and representing a probability that the first section of the sound signal corresponds to a wake-up word; and based on the second probability score exceeding a second threshold value, executing the function corresponding to voice recognition, and the method may further include, based on identifying a predetermined acoustic signal in the sound signal, reducing at least one of the first threshold value or the second threshold value.

The predetermined acoustic signal may include at least one of a clapping sound or a whistle sound, and the method may further include: inputting the sound signal into a sound event detection model; obtaining, as an output of the sound event detection model, one or more third probability scores corresponding to one or more sections of the sound signal, wherein each third probability score of the one or more third probability scores represents a probability that a corresponding section of the one or more sections of the sound signal corresponds to the predetermined acoustic signal, and identifying as the predetermined acoustic signal a section of the sound signal, among the one or more sections of the sound signal, that corresponds to a third probability score, among the one or more third probability scores, that exceeds a third threshold value.

The method may further include: based on identifying the predetermined acoustic signal: identifying a second section of the sound signal corresponding to a first probability score, among the one or more first probability scores, that exceeds a fourth threshold value, and inputting the second section of the sound signal into the wake-up word verification model; obtaining, as an output of the wake-up word verification model, a second probability score for the second section of the sound signal and representing a probability that the second section of the sound signal corresponds to a wake-up word; and based on the second probability score corresponding to the second section of the sound signal exceeding a fifth threshold value, executing the function corresponding to voice recognition, and the fourth threshold value is smaller than the first threshold value, and the fifth threshold value is smaller than the second threshold value.

The method may further include, based on the function corresponding to voice recognition being executed based on the second probability score corresponding to the second section of the sound signal exceeding the fifth threshold value, restoring the fourth threshold value and the fifth threshold value respectively to the first threshold value and the second threshold value.

According to an aspect of the disclosure, a non-transitory computer readable medium stores instructions, which when executed by at least one processor cause the at least one processor to execute a method of controlling an electronic device, the method including:

inputting a sound signal received through a microphone into a wake-up word detection model; obtaining, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word; identifying a first section of the sound signal, among the one or more sections of the sound signal, that corresponds to a first probability score, among the one or more first probability scores, that exceeds a first threshold value; and based on identifying the first section of the sound signal, executing a function corresponding to voice recognition.

The executing the function corresponding to voice recognition may include: inputting the first section of the sound signal into a wake-up word verification model; obtaining, as an output of the wake-up word verification model, a second probability score corresponding to the first section of the sound signal and representing a probability that the first section of the sound signal corresponds to a wake-up word; and based on the second probability score exceeding a second threshold value, executing the function corresponding to voice recognition, and the method may further include, based on identifying a predetermined acoustic signal in the sound signal, reducing at least one of the first threshold value or the second threshold value

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B is an exemplary diagram for illustrating the wake-up operation in FIG. 5A;

DETAILED DESCRIPTION

Figure 1:
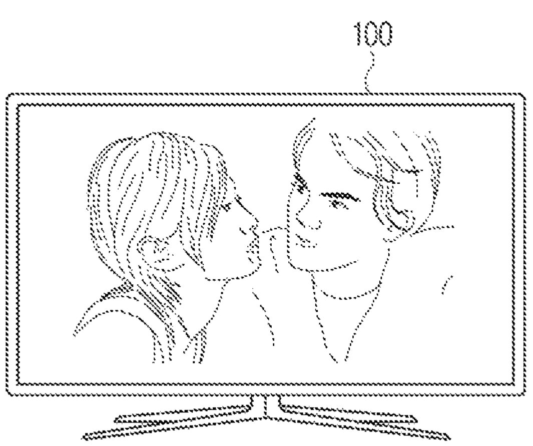
FIG. 1 is a diagram for illustrating a method for an electronic device to activate a voice recognition function according to one or more embodiments of the disclosure.
Figure 1:
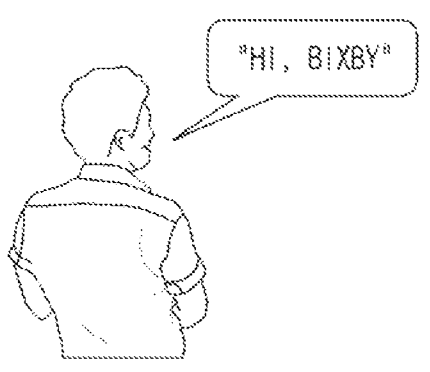

The various embodiments of the disclosure described below with reference to the drawings do not limit the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known technologies may unnecessarily confuse the gist of the disclosure, the detailed explanation will be omitted. In addition, overlapping explanation of the same components will be omitted as much as possible.

Further, the suffix "part" for components used in the following description is added or interchangeably used only in consideration of the convenience in drafting the specification, and it does not have a distinguished meaning or role by itself.

Also, the terms used in the disclosure are used to describe embodiments, and are not intended to restrict and/or limit the disclosure. Further, singular expressions include plural expressions, unless defined obviously differently in the context.

In addition, in the disclosure, terms such as "include" and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, the expressions "first," "second," and the like used in the disclosure may be used to describe various elements regardless of any order and/or degree of importance. Further, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

Herein, the expression "at least one of a, b or c" indicates "only a," "only b," "only c," "both a and b," "both a and c," "both b and c," or "all of a, b, and c."

Further, the terms used in the embodiments of the disclosure may be interpreted as meanings generally known to those of ordinary skill in the art described in the disclosure, unless defined differently in the disclosure.

Hereinafter, various embodiments of the disclosure will be described in detail with reference to the accompanying drawings.

FIG. 1 is a diagram for illustrating a method for an electronic device to activate a voice recognition function according to one or more embodiments of the disclosure.

As illustrated in FIG. 1, the electronic device 100 may be implemented as a smart TV However, this is merely an example, and the electronic device 100 may be implemented as various devices such as an Internet TV, a web TV, an Internet protocol television (IPTV), signage, a monitor, a smartphone, a laptop, a desktop PC, a tablet, a large format display (LFD), digital signage, a digital information display (DID), a video wall, a projector display, a smart speaker, an AI speaker, a smart refrigerator, an access point, a server, a medical device, a wearable device, a refrigerator, an air conditioner, an air purifier, a set-top box, a media box, etc.

As illustrated in FIG. 1, if a user utters a wake-up word such as "Hi, Bixby," the electronic device 100 may receive a sound signal including "Hi, Bixby" through a microphone 110. Here, the wake-up word is a word that makes a function corresponding to voice recognition executed in case the electronic device 100 recognizes it, and in other words, it may also be referred to as a trigger word, a keyword, or a call word, etc. The wake-up word may be predetermined when the electronic device 100 is manufactured, or it may be added/changed/deleted by a user.

When a sound signal is received, the electronic device 100 may identify whether "Hi, Bixby" is included in the received sound signal by using various kinds of models. Here, the used model is an artificial intelligence model that was trained to output the probability that an input sound signal may correspond to the predetermined wake-up word as a score, and it may have been trained by using various kinds of neural network models such as an artificial neural network (ANN), a deep neural network (DNN), a convolution neural network (CNN), a recurrent neural network (RNN), etc., but is not limited thereto.

Specifically, the electronic device 100 may input a sound signal into the artificial intelligence model, and in case the probability score output from the artificial intelligence model exceeds a predetermined threshold value, the electronic device 100 may identify that the predetermined wake-up word is included in the sound signal.

Accordingly, if it is identified that the predetermined wake-up word is included, the electronic device 100 may execute a function corresponding to voice function. For example, the electronic device 100 may activate the stored voice recognition model, or access an external voice recognition server and execute a function corresponding to voice recognition. When the function corresponding to voice recognition is executed, the electronic device 100 may recognize the user's voice instruction received through the microphone 110, and provide various kinds of responses (e.g., provision of a search result, execution of a control instruction, control of another device, etc.) for the recognized instruction.

Here, depending on the noise environment, there is a case wherein, even if the user utters a wake-up word, the electronic device 100 cannot recognize the wake-up word. Thus, according to one or more embodiments of the disclosure, by improving the recognition sensitivity of the electronic device 100 regarding a wake-up word depending on cases, the voice recognition function of the electronic device 100 can be secured in a noise environment.

For example, in case a predetermined sound event such as a clapping sound or a whistle sound occurs, the electronic device 100 may improve the recognition sensitivity of a wake-up word by adjusting the aforementioned predetermined threshold value downward (i.e., reduce the predetermined threshold value).

Figure 2:
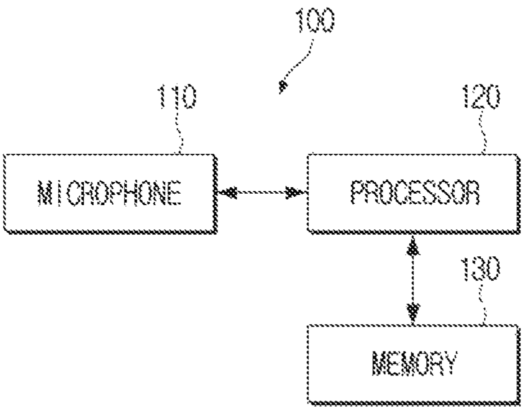
FIG. 2 is a block diagram of an electronic device according to one or more embodiments of the disclosure.

Hereinafter, various embodiments of the disclosure will be described with reference to FIG. 2 to FIG. 5B. FIG. 2 is a block diagram of an electronic device according to one or more embodiments of the disclosure. According to FIG. 2, the electronic device 100 includes a microphone 110, a processor 120, and a memory 130.

The microphone 110 may receive a sound in a form of a sound wave generated from an external sound source and convert it into an electric signal, and provide the sound signal converted into the electric signal to the processor 120.

The memory 130 may store instructions or data related to at least one other component of the electronic device 100. For this, the memory 130 may be implemented as a volatile memory (e.g., a dynamic random-access memory (RAM) and a static RAM (SRAM)), a non-volatile memory (a flash memory, a programmable read-only memory (PROM), a magnetoresistive random-access memory (MRAM), and a resistive RAM (RRAM)), a hard disc drive (HDD), or a solid state drive (SSD), etc.

The volatile memory refers to a memory that needs constant power supply for maintaining the stored information. The volatile memory may be implemented as a separate component from the processor 120 that can be interlocked with the processor 120, but this is merely an example, and the volatile memory may be implemented in a form of being included in the processor 120 as a component of the processor 120. The non-volatile memory refers to a memory that can maintain the stored information even if power supply is stopped.

The memory 130 may be accessed by the processor 120, and reading/recording/correction/deletion/update, etc. of data by the processor 120 may be performed. In the disclosure, the term memory may include the memory 130, a ROM and a RAM inside the processor 120, or a memory card (e.g., a micro SD card, a memory stick) mounted on the electronic device 100.

In particular, the memory 130 may store a wake-up word detection model and a wake-up word verification model that output a probability score that an input sound signal may correspond to a wake-up word.

Here, the wake-up word detection model is an artificial intelligence model that performs a streaming operation with a relatively less operation amount than the wake-up word verification model, and the processor 120 may detect a sound signal section including the wake-up word among sound signals that are streaming input in real time through the microphone 110 by using the wake-up word detection model.

The wake-up word verification model is an artificial intelligence model that has a relatively large operation amount but has high performance, and outputs a probability score for a sound signal for a specific time section, but not all sound signals that are streaming input through the microphone 110, and the processor 120 may verify whether the wake-up word exists in the sound signal section detected through the wake-up word detection model more clearly by using the wake-up word verification model.

The memory 130 may store a sound event detection model. Here, the sound event detection model is an artificial intelligence model that outputs a probability score that an input may correspond to a predetermined acoustic signal, and the processor 120 may identify whether the predetermined acoustic signal such as a clapping sound or a whistle sound was generated by using the sound event detection model.

The predetermined acoustic signal is classified as a sound signal including the wake-up word that is streamed and input, and thus it may be referred to as a second sound signal. Also, a sound signal that is streamed and input may be referred to as a first sound signal. As used herein, "streamed" is used to refer to an audio signal received through a microphone, including continuous reception through a microphone in a "listening" mode.

Also, depending on embodiments, the memory 130 may store a voice recognition model. A voice recognition model is an artificial intelligence model that can provide a response to a user's voice, and it may include at least one function from among an auto speech recognition (ASR) function and a natural language understanding (NLU) function, but is not limited thereto. In this case, the processor 120 may execute a function corresponding to voice recognition by activating the voice recognition model.

Each of the aforementioned models may be stored in a non-volatile memory, and may then be loaded on a volatile memory and activated by control by the processor 120. For example, the wake-up word detection model, the wake-up word verification model, and the sound event detection model may be activated while the power of the electronic device 100 is turned on, and the voice recognition model may be activated in case an output of the wake-up word verification model exceeds a threshold value, i.e., in case the wake-up word was recognized, but is not limited thereto.

The processor 120 may be electrically connected with the memory 130 and control the overall operations and functions of the electronic device 100.

For this, the processor 120 may include one or more of a central processing unit (CPU) processing digital signals, a micro controller unit (MCU), a micro processing unit (MPU), a controller, an application processor (AP), or a communication processor (CP), and an ARM processor, or may be defined by the terms.

Also, the processor 120 may be implemented as a system on chip (SoC) having a processing algorithm stored therein or large scale integration (LSI), or in the form of a field programmable gate array (FPGA).

The processor 120 may perform various functions by executing computer executable instructions stored in the memory 130. In addition, the processor 120 may include at least one of a graphics-processing unit (GPU), a neural processing unit (NPU), or a visual processing unit (VPU) which are separate AI-dedicated processors for performing artificial intelligence functions.

In particular, the processor 120 may identify whether the wake-up word is included in a sound signal streamed through the microphone 110, and in case the wake-up word is included, execute a function corresponding to voice recognition.

Hereinafter, various embodiments of the disclosure will be described in detail with reference to FIG. 3A to FIG. 5B. In FIG. 3A to FIG. 5B, a wake-up operation means an operation wherein the processor 120 executes a function corresponding to voice recognition.

Figure 3A:
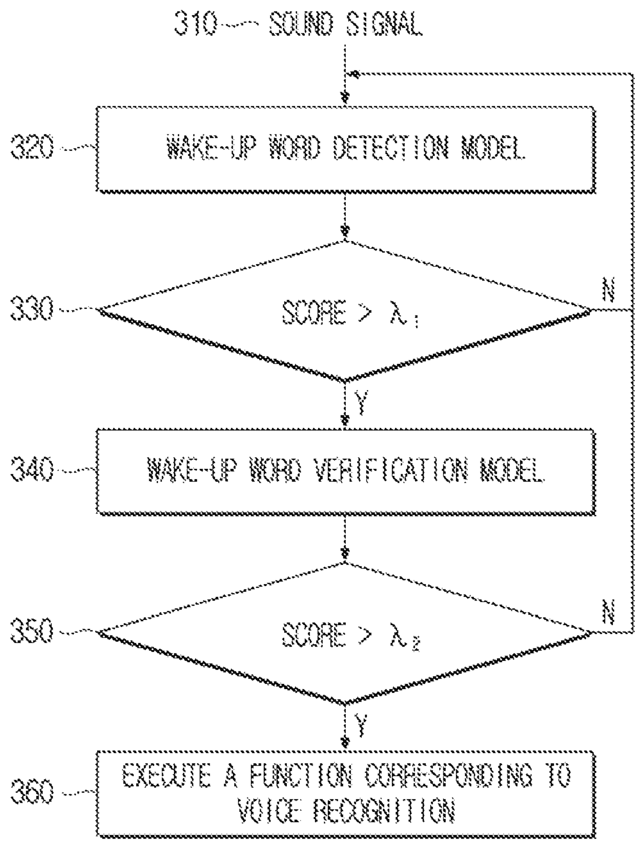
FIG. 3A is a flow chart illustrating a wake-up operation of an electronic device according to one or more embodiments of the disclosure.

FIG. 3A is a flow chart illustrating a wake-up operation of an electronic device according to one or more embodiments of the disclosure.

Referring to FIG. 3A, the processor 120 may input a sound signal (310) streamed through the microphone 110 into the wake-up word detection model (320), and acquire a probability score output from the wake-up word detection model. Hereinafter, for the convenience of explanation of the disclosure, the probability score acquired by the wake-up word detection model will be referred to as a first probability score.

Here, if the first probability score exceeds a first threshold value $\lambda_1$, the processor 120 may identify a sound signal section corresponding to a section exceeding (i.e., greater than) the first threshold value $\lambda_1$ among sound signals streamed through the microphone 110. More specifically, the processor 120 may detect a section wherein the first probability score exceeds the first threshold value $\lambda_1$, i.e., a sound signal section corresponding to the wake-up word among sound signals streamed through the microphone 110.

Here, the processor 120 may execute a function corresponding to voice recognition based on the detected sound signal section corresponding to the section exceeding the first threshold value $\lambda_1$. More specifically, the processor 120 may identify a sound signal section corresponding to the section exceeding the first threshold value (330), and input the identified sound signal section into the wake-up word verification model (340).

Accordingly, the processor 120 may acquire a probability score output from the wake-up word verification model. Hereinafter, for the convenience of explanation of the disclosure, the probability score acquired by the wake-up word verification model will be referred to as a first probability score.

Here, if a second probability score exceeds a second threshold value $\lambda_2$ (350), the processor 120 may execute the function corresponding to voice recognition (360).

Figure 3B:
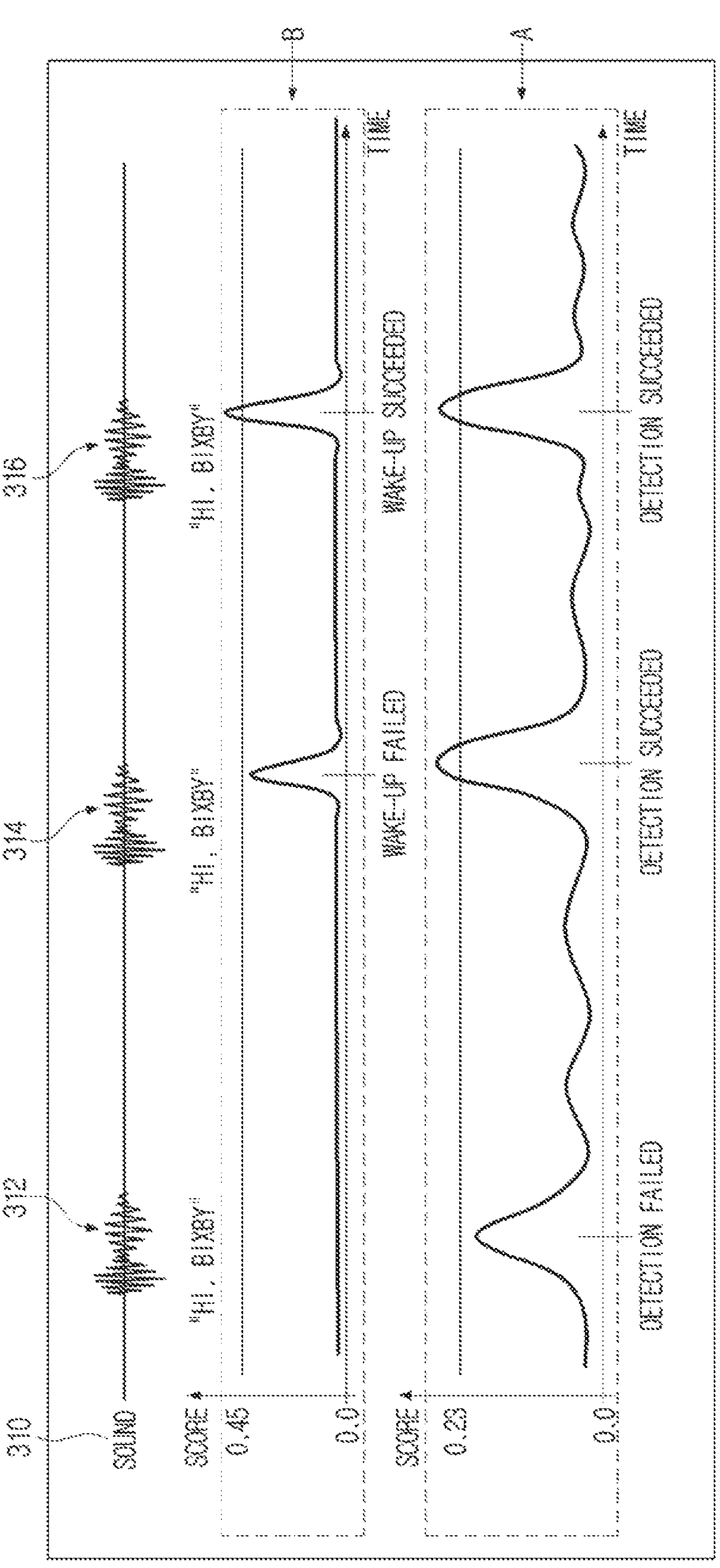
FIG. 3B is an exemplary diagram for illustrating the wake-up operation in FIG. 3A.

FIG. 3B is an exemplary diagram for illustrating the wake-up operation in FIG. 3A. In FIG. 3B, the lower graph A from among the two graphs indicating scores according to time indicates an output of the wake-up word detection model, and the upper graph B indicates an output of the wake-up word verification model.

According to FIG. 3B, in the case of the first sound signal 312 including "Hi, Bixby," it can be seen that, as the output of the wake-up word detection model does not reach the first threshold value 0.23 due to the ambient noise, the function corresponding to voice recognition is not executed.

In the case of the second sound signal 314 including "Hi, Bixby," as the output of the wake-up word detection model exceeds the first threshold value 0.23, the sound section is input into the wake-up word verification model. However, it can be seen that, as the output value of the wake-up word verification model does not exceed the second threshold value 0.45, the function corresponding to voice recognition is not executed, either.

In the case of the third sound signal 316 including "Hi, Bixby," as the output value of the wake-up word detection model exceeds the first threshold value 0.23, and the output value of the wake-up word verification model exceeds the second threshold value 0.45, the processor 120 gets to execute the function corresponding to voice recognition in response to the third "Hi, Bixby" signal.

Figure 4A:
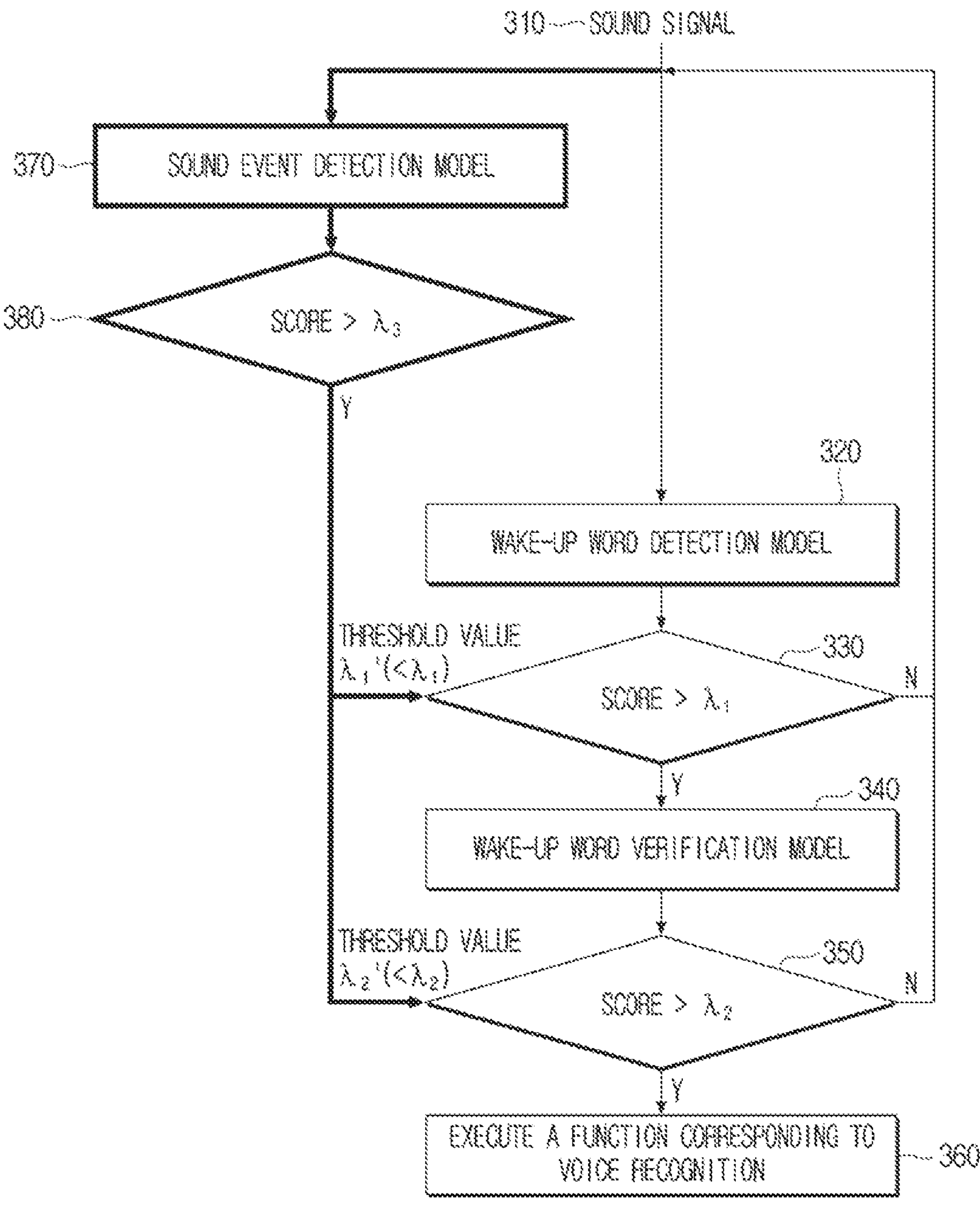
FIG. 4A is a flow chart illustrating a wake-up operation of an electronic device according to one or more embodiments of the disclosure.

FIG. 4A is a flow chart illustrating a wake-up operation of an electronic device according to one or more embodiments of the disclosure.

Referring to FIG. 4A, the processor 120 may input a sound signal streamed through the microphone 110 into the wake-up word detection model, and if the first probability score output from the wake-up word detection model exceeds the first threshold value $\lambda_1$, input a sound signal section corresponding to a section exceeding the first threshold value $\lambda_1$ into the wake-up word verification model.

Accordingly, if the second probability score output from the wake-up word verification model exceeds the second threshold value $\lambda_2$, the processor 120 may execute the function corresponding to voice recognition.

So far, the embodiment is identical to the embodiment described above through FIG. 3A. However, according to FIG. 4A, if the predetermined acoustic signal is identified, the processor 120 may adjust the first threshold value $\lambda_1$ and the second threshold value $\lambda_2$ downward, and thereby enhance the wake-word sensitivity.

Specifically, as illustrated in FIG. 4A, the processor 120 may input a sound signal (310) streamed through the microphone 110 into the sound event detection model (370), and acquire a probability score output from the sound event detection model. Hereinafter, for the convenience of explanation of the disclosure, the probability score acquired by the sound event detection model will be referred to as a third probability score.

If the acquired third probability score exceeds the third threshold value $\lambda_3$ (380), the processor 120 may determine that the predetermined acoustic signal is identified. Accordingly, the processor 120 may adjust the first threshold value $\lambda_1$ downward to a fourth threshold value $\lambda'_1$, and adjust the second threshold value $\lambda_2$ downward to a fifth threshold value $\lambda'_2$.

Here, according to an embodiment, if predetermined time passes after the predetermined acoustic signal is identified, the processor 120 may restore the threshold values adjusted downward to the original values.

Regarding a sound signal that is input through the microphone 110 (310) while the threshold values are adjusted downward, the threshold values adjusted downward are applied. That is, if the predetermined acoustic signal is identified, the processor 120 may input a sound signal section corresponding to a section wherein the first probability score output from the wake-up word detection model exceeds the fourth threshold value $\lambda'_1$ into the wake-up word verification model (340), and if the second probability score output from the wake-up word verification model exceeds the fifth threshold value $\lambda'_2$, the processor 120 may execute the function corresponding to voice recognition.

According to an embodiment, if the function corresponding to voice recognition is executed based on the fourth threshold value $\lambda'_1$ and the fifth threshold value $\lambda'_2$ (i.e., if the wake-up word is recognized while the threshold values are adjusted downward), the processor 120 may restore the threshold values adjusted downward (i.e., the fourth threshold value M and the fifth threshold value $\lambda'_2$) to the original values (i.e., the first threshold value $\lambda_1$ and the second threshold value $\lambda_2$), even before the predetermined time passes.

Figure 4B:
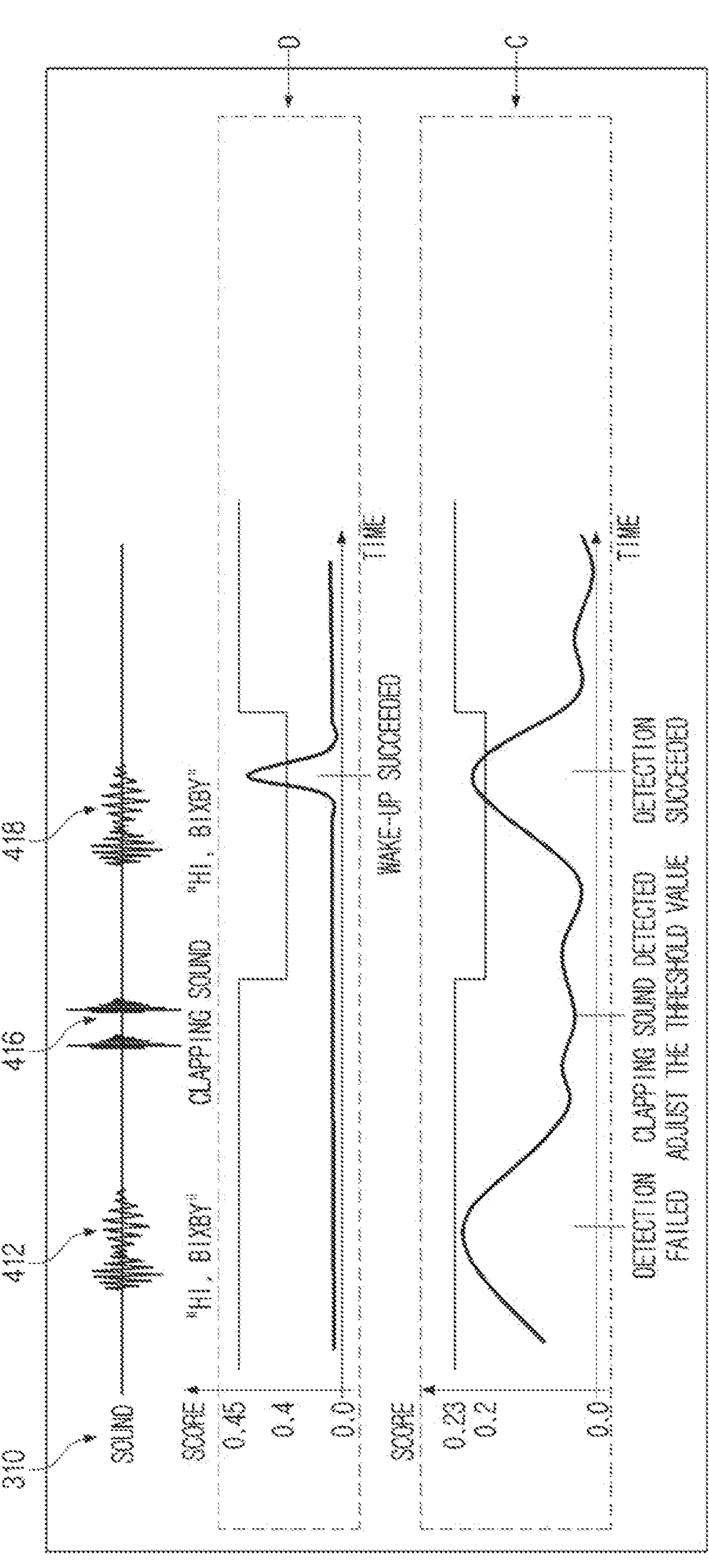
FIG. 4B is an exemplary diagram for illustrating the wake-up operation in FIG. 4A.

FIG. 4B is an exemplary diagram for illustrating the wake-up operation in FIG. 4A. In FIG. 4B, the lower graph C from among the two graphs indicating scores according to time indicates an output of the wake-up word detection model, and the upper graph D indicates an output of the wake-up word verification model.

According to FIG. 4B, in the case of the first sound signal 412 including “Hi, Bixby,” it can be seen that, as the output of the wake-up word detection model is close to the first threshold value 0.23 but does not exceed the value, the function corresponding to voice recognition is not executed.

It can be seen that, as the predetermined acoustic signal 416 such as a clapping sound was identified afterwards, the first threshold value 0.23 and the second threshold value 0.45 were respectively adjusted downward to the fourth threshold value 0.2 and the fifth threshold value 0.4.

As can be seen above, in the case of the second sound signal 418 including “Hi, Bixby” that was input after the threshold values were adjusted downwards, the output of the wake-up word detection model exceeds the fourth threshold value 0.2, and the output of the wake-up word verification model exceeds the fifth threshold value 0.4, and thus the processor 120 gets to execute the function corresponding to voice recognition in response to the second “Hi, Bixby” signal.

As described above, each threshold value may be restored to the value before adjustment after wake-up succeeded.

Figure 5A:
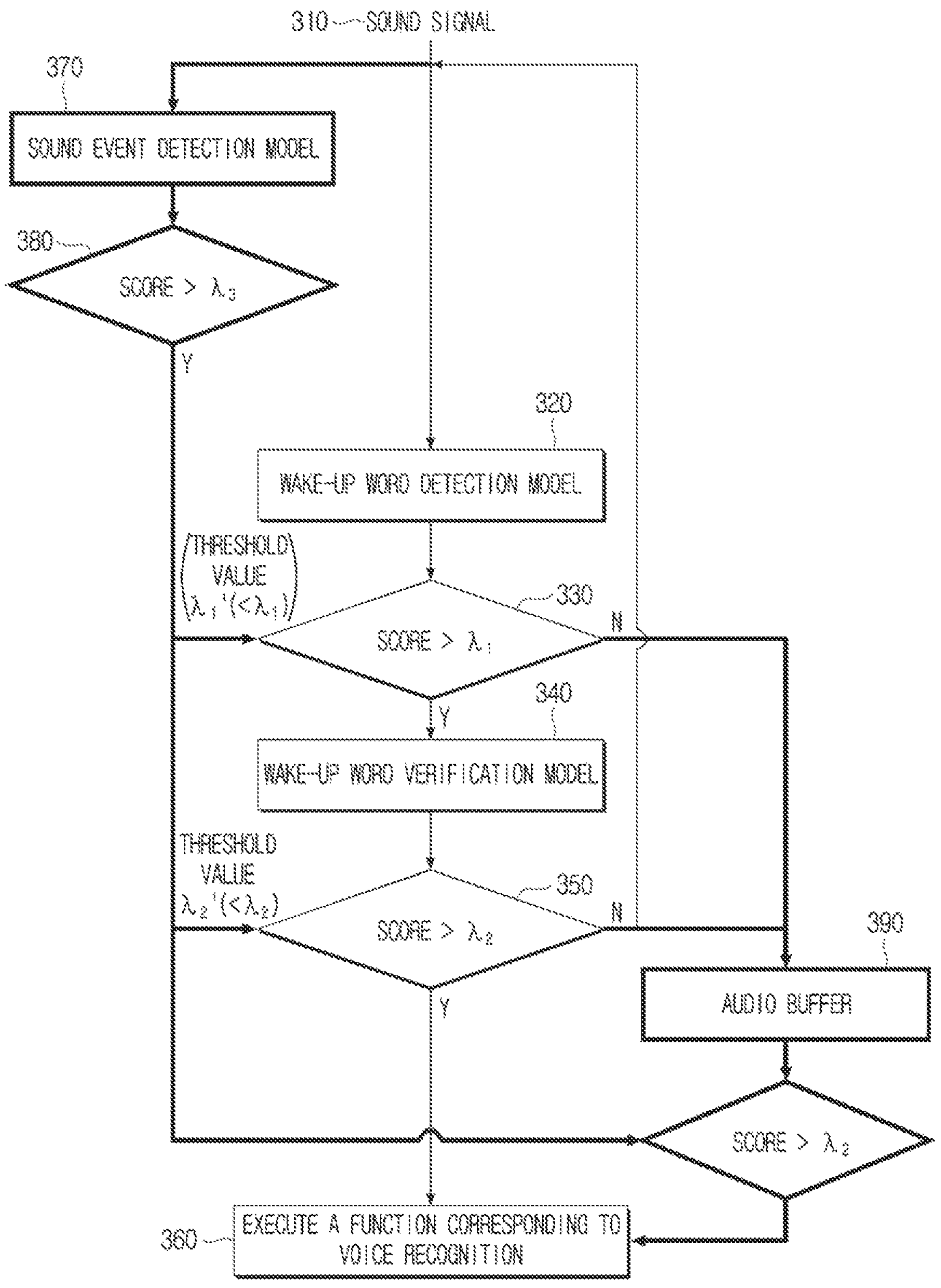
FIG. 5A is a flow chart illustrating a wake-up operation of an electronic device according to one or more embodiments of the disclosure.

FIG. 5A is a flow chart illustrating a wake-up operation of an electronic device according to one or more embodiments of the disclosure.

Referring to FIG. 5A, the processor 120 may input a sound signal (310) streamed through the microphone 110 into the wake-up word detection model (320), and if the first probability score output from the wake-up word detection model exceeds the first threshold value $\lambda_1$ (330), input a sound signal section corresponding to a section exceeding the first threshold value into the wake-up word verification model (340).

Accordingly, if the second probability score output from the wake-up word verification model exceeds the second threshold value $\lambda_2$ (350), the processor 120 may perform the function corresponding to voice recognition (360).

So far, the embodiment is identical to the embodiment described above through FIG. 3A. However, according to an embodiment of the disclosure, in case the first probability score output from the wake-up word detection model falls under a specific section, the processor 120 may store the sound signal section in the memory 130. When the predetermined acoustic signal is identified afterwards, the processor 120 may adjust the second threshold value $\lambda_2$ downward to the fifth threshold value $\lambda'_2$, and determine whether to perform a wake-up operation by re-evaluating the sound signal section stored in the memory 130 based on the threshold value adjusted downward (i.e., $\lambda'_2$). Here, according to an embodiment of the disclosure, the first threshold value $\lambda_1$ may also be adjusted downward to the fourth threshold value $\lambda'_1$.

Specifically, referring to FIG. 5A, even if the first probability score output from the wake-up word detection model does not exceed the first threshold value $\lambda_1$, if the score is greater than or equal to a sixth threshold value, the processor 120 may store the sound signal section in an audio buffer 390.

If the predetermined acoustic signal is identified in a state as a specific sound signal section is stored in the audio buffer as above, the processor 120 may improve the wake-up word sensitivity by adjusting the second threshold value $\lambda_2$ downward. That is, as illustrated in FIG. 5A, the processor 120 may input a sound signal streamed through the microphone 110 into the sound event detection model, and if the third probability score output from the sound event detection model exceeds the third threshold value $\lambda_3$, determine that the predetermined acoustic signal was identified, and adjust the second threshold value $\lambda_2$ downward to the fifth threshold value $\lambda'_2$. Here, according to an embodiment, the first threshold value $\lambda_1$ may also be adjusted downward to the fourth threshold value $\lambda'_1$.

Accordingly, the processor 120 may input the sound signal section stored in the audio buffer into the wake-up word verification model, and if the second probability score output from the wake-up word verification model exceeds the fifth threshold value $\lambda'_2$, execute the function corresponding to voice recognition.

According to an embodiment, in case the number of the sound signal sections stored in the memory 130 (i.e., the audio buffer) is two or more, the processor 120 may input the sound signal sections stored in the audio buffer into the wake-up word verification model, but the disclosure is not limited thereto.

Also, according to an embodiment, if the function corresponding to voice recognition is executed based on the fifth threshold value $\lambda'_2$, the processor 120 may delete the sound signal section stored in the memory 130 (i.e., the audio buffer), and restore the fifth threshold value $\lambda'_2$ to the second threshold value $\lambda_2$.

FIG. 5B is an exemplary diagram for illustrating the wake-up operation in FIG. 5A. In FIG. 5B, the lower graph E from among the two graphs indicating scores according to time indicates an output of the wake-up word detection model, and the upper graph F indicates an output of the wake-up word verification model.

According to FIG. 5B, in the case of the first sound signal 512 including “Hi, Bixby,” it can be seen that, as the output of the wake-up word detection model is close to the first threshold value 0.23 but does not exceed the value, the function corresponding to voice recognition is not immediately executed on the time point when the first “Hi, Bixby” signal 512 was input. However, as the output of the wake-up word detection model is greater than or equal to the sixth threshold value 0.2, the sound signal section is stored in the audio buffer 390.

The output of the wake-up word detection model for the second sound signal 514 including “Hi, Bixby” also falls under between the first threshold value 0.23 and the sixth threshold value 0.2, and thus the function corresponding to voice execution is not executed, but the sound signal section is stored in the audio buffer.

Afterwards, if the predetermined acoustic signal 516 such as a clapping sound is identified, the processor 120 may adjust the second threshold value $\lambda_2$ downward to the fifth threshold value $\lambda'_2$. Here, according to an embodiment, the first threshold value $\lambda_1$ may also be adjusted downward to the fourth threshold value $\lambda'_1$. In FIG. 5B, it can be seen that the second threshold value 0.45 was adjusted downward to the fifth threshold value 0.4.

After adjusting the threshold values, the processor 120 may identify the number of the sound signal sections stored in the audio buffer 390 (two in the example of FIG. 5B), and in case the identified number is greater than or equal to a predetermined number, input the sound signal sections stored in the audio buffer into the wake-up word verification model. Accordingly, if the output of the wake-up word verification model exceeds the fifth threshold value $\lambda'_2$, the processor 120 may execute the function corresponding to voice recognition.

Here, according to an embodiment, if any one of the outputs of the wake-up word verification model for the sound signal sections stored in the audio buffer exceeds the fifth threshold value $\lambda'_2$, the processor 120 may execute the function corresponding to voice recognition. However, the disclosure is not limited thereto, and depending on embodiments, the processor 120 may execute the function corresponding to voice recognition in case all of the outputs of the wake-up word verification model for the sound signal sections stored in the audio buffer exceed the fifth threshold value $\lambda'_2$.

In the embodiment of FIG. 5B, it can be seen that all of the outputs of the wake-up word verification model for the two sound signal sections stored in the audio buffer are greater than or equal to the fifth threshold value 0.4, and the function corresponding to voice recognition is executed when it is identified that the output of the wake-up word verification model for the first sound signal section from among them exceeds the fifth threshold value 0.4. However, the disclosure is not limited thereto.

As described above, the audio buffer may be initialized after wake-up succeeds, and the threshold values that were adjusted downward may be restored.

According to an embodiment of the disclosure, the degree of downward adjustment of the threshold values described above may be determined based on the noise level around the electronic device 100. Specifically, the processor 120 may analyze a sound signal streamed through the microphone 110 and calculate a noise level, and adjust the degree of the adjustment according to the calculated noise level. Here, for the method of calculating a noise level from an input sound signal, various known technologies may be used.

As it is logical to enhance the sensitivity for wake-up word recognition as the ambient noise level is higher, for example, the processor 120 may adjust the threshold values more downward as the ambient noise level is higher, but embodiments are not limited thereto.

Figure 6:
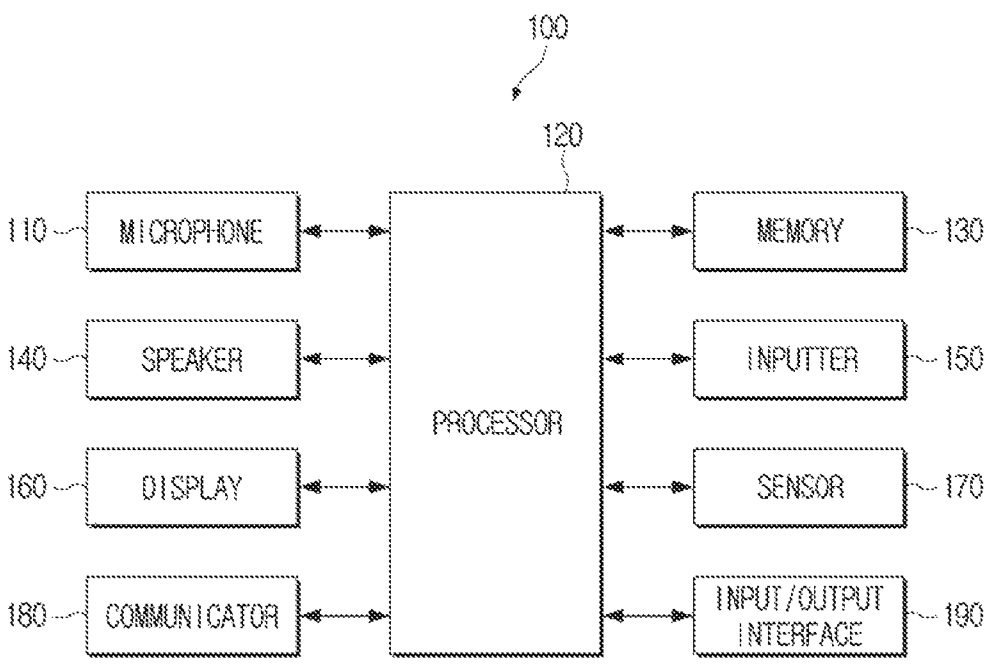
FIG. 6 is a block diagram of an electronic device according to one or more embodiments of the disclosure.

FIG. 6 is a block diagram of an electronic device according to one or more embodiments of the disclosure. FIG. 6 comprehensively illustrated various kinds of components that may be included in the electronic device 100. Accordingly, depending on embodiments, some of the components illustrated in FIG. 6 may be omitted or changed, or other components may further be added. In explaining FIG. 6, explanation regarding contents that overlap with the aforementioned contents will be omitted.

According to FIG. 6, the electronic device 100 may include a microphone 110, a processor 120, a memory 130, a speaker 140, an inputter 150, a display 160, a sensor 170, a communicator 180, and an input/output interface 190.

The speaker 140 is a component that outputs various kinds of audio data, various kinds of notification sounds, or voice messages for which various processing jobs such as decoding or amplification, noise filtering, etc. were performed by an audio processor. A component for outputting audio may be implemented as a speaker, but this is merely an example, and it may be implemented as an output terminal that can output audio data.

The inputter 150 may receive a user input for controlling the electronic device 100. In particular, the inputter 150 may include a touch panel for receiving inputs of user touches using the user's hand or a stylus pen, etc. a button for receiving an input of a user manipulation, etc. Other than the above, the inputter 150 may also be implemented as a different input device (e.g., a keyboard, a mouse, a motion inputter, etc.).

The display 160 may display various kinds of information according to control by the processor 120. In particular, in case the voice recognition function is executed, the display 160 may display an indicator that the voice recognition function is being executed by control by the processor 120. Further, the display 160 may display a message or a UI requesting a user voice for a voice recognition operation by control by the processor 120.

Also, the display 160 may be implemented as a touch screen together with a touch panel. In addition, the panel of the display 160 may be implemented with various display technologies such as a liquid crystal display (LCD), organic light emitting diodes (OLEDs), active matrix organic light emitting diodes (AM-OLEDs), liquid crystal on silicon (LcoS), quantum dot light emitting diodes (QLED), digital light processing (DLP), micro light emitting diodes (micro-LEDs), mini light emitting diodes (mini-LEDs), etc.

The sensor 170 may include a sensor that can detect the environment information around the electronic device 100 (e.g., a temperature sensor, a humidity sensor, a barometric pressure sensor, etc.), a sensor that can detect existence of a user (e.g., a camera, a UWB sensor, an IR sensor, a proximity sensor, an optical sensor, etc.), and the like. Other than the above, the sensor 170 may further include an image sensor for photographing the outside of the electronic device 100, etc.

The communicator 180 may include a circuit, and perform communication with an external device. Here, communicative connection of the communicator 180 with an external device may include communication via a third device (e.g., a repeater, a hub, an access point, a server, or a gateway, etc.).

In the above, a case wherein the microphone 110 is included in the electronic device 100 was suggested as an example, but embodiments are not limited thereto. That is, depending on embodiments, the microphone 110 may be included in another external device which is not the electronic device 100. In this case, if a sound signal is input through the microphone 110, the another electronic device may transmit the signal to the electronic device 100, and the processor 120 may receive the sound signal transmitted by the another electronic device through the communicator 180, and perform the operations according to the aforementioned various embodiments.

Also, the communicator 180 may perform communication with an external voice recognition server. Accordingly, in case an output of the wake-up word verification model exceeds the threshold value, i.e., in case the wake-up word is recognized, the processor 120 may access the voice recognition server through the communicator 180 and execute the function corresponding to voice recognition.

For this, the communicator 180 may include various communication modules for performing communication with various external devices. For example, the communicator 180 may include a wired LAN communication module such as an Ethernet module. Also, the communicator 180 may include a wireless LAN communication module such as a Wi-Fi communication module.

In addition, the communicator 180 may include a near field wireless communication module or a mobile communication module, depending on embodiments. Here, a near field wireless communication module refers to a communication module performing data communication with an electronic device located in a near distance wirelessly such as a Bluetooth module, a Zigbee module, a near field communication (NFC) module, for example. Also, a mobile communication module refers to a communication module that accesses a mobile communication network and performs communication according to various mobile communication protocols such as 3rd Generation (3G), 3rd Generation Partnership Project (3GPP), Long Term Evolution (LTE), etc.

Depending on embodiments, the communicator 180 may include a broadcasting reception module, and may also include at least one of wired communication modules such as a universal serial bus (USB), the Institute of Electrical and Electronics Engineers (IEEE) 1394, the RS-232, a high definition multimedia interface (HDMI), etc.

The input/output interface 190 may input or output at least one of an audio signal or an image signal. In particular, the input/output interface 190 may receive an input of an image including at least one of a content or a UI from an external device, and output a control instruction to the external device.

Here, the input/output interface 190 may be a high definition multimedia interface (HDMI), but this is merely an example, and the input/output interface 190 may be any one interface among a mobile high-definition link (MHL), a universal serial bus (USB), a display port (DP), a Thunderbolt, a video graphics array (VGA) port, an RGB port, a D-subminiature (D-SUB), and a digital visual interface (DVI).

Depending on embodiments, the input/output interface 190 may include a port inputting or outputting only audio signals and a port inputting or outputting only image signals as separate ports, or may be implemented as one port that inputs or outputs all of audio signals and image signals.

In FIG. 6, the communicator 180 and the input/output interface 190 are illustrated as separate components, but this is merely an example, and the input/output interface 190 may be implemented in a form of being included in the communicator 180.

Figure 7:
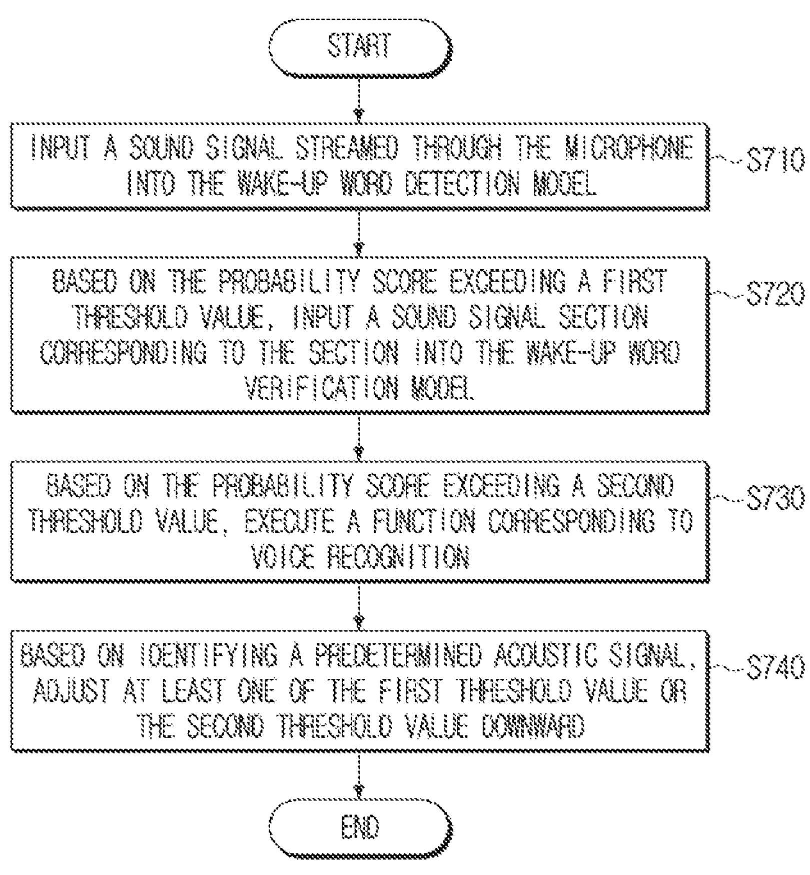
FIG. 7 is a flow chart illustrating a control method of an electronic device according to one or more embodiments of the disclosure.

FIG. 7 is a flow chart illustrating a control method of an electronic device according to one or more embodiments of the disclosure.

According to one or more embodiments of the disclosure, in controlling the electronic device 100, the processor 120 may input a sound signal streamed through the microphone 110 into the wake-up word detection model. Here, the processor 120 may acquire a first probability score output from the wake-up word detection model. If the first probability score exceeds a first threshold value, the processor 120 may execute a function corresponding to voice recognition based on a sound signal section corresponding to a section exceeding the first threshold value among sound signals streamed through the microphone 110. Then, if a predetermined acoustic signal is identified, the processor 120 may adjust the first threshold value downward.

More specifically, referring to FIG. 7, for executing the function corresponding to voice recognition, the processor 120 may input a sound signal section corresponding to a section exceeding the first threshold value into the wake-up word verification model in operation S720.

Afterwards, if a second probability score output from the wake-up word verification model exceeds a second threshold value, the processor 120 may execute the function corresponding to voice recognition in operation S730.

Here, if a predetermined acoustic signal such as a clapping sound or a whistle sound is identified, the processor 120 may adjust at least one of the first threshold value or the second threshold value downward in operation S740. For example, the processor 120 may input the sound signal streamed through the microphone 110 into a sound event detection model, and if a third probability score output from the sound event detection model exceeds a third threshold value, adjust at least one of the first threshold value or the second threshold value downward.

As described above, if the threshold value is adjusted downward, the processor 120 may perform a wake-up word recognizing operation based on the threshold value that was adjusted downward.

Specifically, according to one or more embodiments of the disclosure, if the predetermined acoustic signal is identified, the processor 120 may input a sound signal section corresponding to a section wherein the first probability score output from the wake-up word detection model exceeds a fourth threshold value into the wake-up word verification model, and if the second probability score output from the wake-up word verification model exceeds a fifth threshold value, execute the function corresponding to voice recognition. Here, the fourth threshold value is a value that the first threshold value was adjusted downward, and the fifth threshold value is a value that the second threshold value was adjusted downward.

Also, if the function corresponding to voice recognition is executed based on the fourth threshold value and the fifth threshold value, the processor 120 may restore the fourth threshold value and the fifth threshold value respectively to the first threshold value and the second threshold value.

According to one or more embodiments of the disclosure, if the first probability score output from the wake-up word detection model falls under a specific section (e.g., between the first threshold value and the sixth threshold value), the processor 120 may store a sound signal section corresponding to a section falling under between the first threshold value and the sixth threshold value in the memory 130 (specifically, the audio buffer).

Also, if the predetermined acoustic signal is identified after the sound signal section corresponding to the section falling under between the first threshold value and the sixth threshold value is identified, the processor 120 may input the stored sound signal section into the wake-up word verification model, and if the second probability score output from the wake-up word verification model exceeds a fifth threshold value, execute the function corresponding to voice recognition. Here, the fifth threshold value is the value that the second threshold value was adjusted downward described above.

Here, according to one or more embodiments of the disclosure, in case there are two or more sound signal sections stored in the audio buffer, the processor 120 may input the stored sound signal sections into the wake-up word verification model.

Also, if the function corresponding to voice recognition is executed based on the fifth threshold value, the processor 120 may delete the stored sound signal section, and restore the fifth threshold value to the second threshold value.

According to one or more embodiments of the disclosure, the processor 120 may analyze the sound signal streamed through the microphone 110 and calculate a noise level, and determine a degree of the adjustment of the threshold values described above according to the calculated noise level.

Also, when a predetermined time passes after the predetermined acoustic signal was identified and the threshold value was adjusted downward, the processor 120 may restore the threshold value adjusted downward to the original threshold value.

According to the various embodiments of the disclosure as above, a user can enhance the sensitivity of the electronic device 100 for wake-up word recognition by using a specific sound (e.g., a clapping sound or a whistle sound, etc.) that can be recognized easily by the electronic device 100. Accordingly, the user can use the voice recognition function of the electronic device 100 through utterances more easily in various noise environments.

The various embodiments of the disclosure may be implemented as software including instructions stored in machine-readable storage media, which can be read by machines (e.g., computers). Here, the machines refer to devices that call instructions stored in a storage medium, and can operate according to the called instructions, and the devices may include the electronic device 100 according to the embodiments disclosed herein.

In case an instruction as above is executed by various kinds of processors, the processors may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term "non-transitory' only means that a storage medium does not include signals, and is tangible, but does not indicate whether data is stored in the storage medium semi-permanently or temporarily.

Also, according to one more embodiments, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or can be distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the various embodiments may consist of a singular object or a plurality of objects. Also, among the aforementioned corresponding sub components, some sub components may be omitted, or one or more other sub components may be further included in the various embodiments. Alternatively or additionally, some components (e.g., a module or a program) may be integrated as one entity, and perform functions that were performed by each of the components before integration identically or in a similar manner. The operations performed by a module, a program, or other components according to the various embodiments may be executed sequentially, in parallel, repetitively, or heuristically. Or, at least some of the operations may be executed in a different order or omitted, or other operations may be added.

The descriptions above are merely examples to provide explanation of the technical idea of the disclosure, and various changes and modifications may be made by those having ordinary skill in the technical field to which the disclosure belongs, within the scope of the intrinsic characteristics of the disclosure. Also, the embodiments according to the disclosure are not for limiting the technical idea of the disclosure, but for explaining the technical idea, and the scope of the technical idea of the disclosure is not limited by the embodiments. Accordingly, the scope of protection of the disclosure should be interpreted based on the appended claims, and all technical ideas within an equivalent scope thereto should be interpreted to belong to the scope of protection of the disclosure.

What is claimed is:

1. An electronic device comprising:

a microphone;

at least one memory storing a wake-up word detection model, a wake-up word verification model, and one or more instructions; and at least one processor configured to execute the one or more instructions, wherein the one or more instructions, when executed by the at least one processor, cause the electronic device to:

obtain a sound signal received through the microphone, input the sound signal into the wake-up word detection model, obtain, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word, identify a first section of the sound signal, among the one or more sections of the sound signal, that corresponds to a first probability score, among the one or more first probability scores, that exceeds a first threshold value, based on identifying the first section of the sound signal, input the first section of the sound signal into the wake-up word verification model, and obtain, as an output of the wake-up word verification model, a second probability score corresponding to the first section of the sound signal and representing a probability that the first section of the sound signal corresponds to a wake-up word, based on the second probability score corresponding to the first section of the sound signal exceeding a second threshold value, execute a function corresponding to voice recognition, and based on identifying a predetermined acoustic signal in the sound signal, reduce the second threshold value.

2. The electronic device of claim 1, wherein the one or more instructions, when executed by the at least one processor, further cause the electronic device to:

based on identifying the first section of the sound signal, execute a function corresponding to voice recognition.

3. The electronic device of claim 1, wherein the one or more instructions, when executed by the at least one processor, further cause the electronic device to:

based on identifying the predetermined acoustic signal in the sound signal, reduce the first threshold value.

4. The electronic device of claim 3, wherein the predetermined acoustic signal comprises at least one of a clapping sound or a whistle sound, wherein the at least one memory stores a sound event detection model, and wherein the one or more instructions, when executed by the at least one processor, further cause the electronic device to:

input the sound signal into the sound event detection model, obtain, as an output of the sound event detection model, one or more third probability scores corresponding to one or more sections of the sound signal, wherein each third probability score of the one or more third probability scores represents a probability that a corresponding section of the one or more sections of the sound signal corresponds to the predetermined acoustic signal, and identify as the predetermined acoustic signal a section of the sound signal, among the one or more sections of the sound signal, that corresponds to a third probability score, among the one or more third probability scores, that exceeds a third threshold value.

5. The electronic device of claim 4, wherein the one or more instructions, when executed by the at least one processor, further cause the electronic device to:

based on identifying the predetermined acoustic signal:

identify a second section of the sound signal corresponding to a first probability score, among the one or more first probability scores, that exceeds a fourth threshold value, and input the second section of the sound signal into the wake-up word verification model, obtain, as an output of the wake-up word verification model, a second probability score corresponding to the second section of the sound signal representing a probability that the second section of the sound signal corresponds to a wake-up word, and based on the second probability score corresponding to the second section of the sound signal exceeding a fifth threshold value, execute the function corresponding to voice recognition, and wherein the fourth threshold value is smaller than the first threshold value, and the fifth threshold value is smaller than the second threshold value.

6. The electronic device of claim 5, wherein the one or more instructions, when executed by the at least one processor, further cause the electronic device to:

based on the function corresponding to voice recognition being executed based on the second probability score corresponding to the second section of the sound signal exceeding the fifth threshold value, restore the fourth threshold value and the fifth threshold value respectively to the first threshold value and the second threshold value.

7. The electronic device of claim 3, wherein the one or more instructions, when executed by the at least one processor, further cause the electronic device to:

identify a third section of the sound signal corresponding to a first probability score among the one or more first probability scores with a value between the first threshold value and a sixth threshold value, based on identifying the third section of the sound signal, store the third section of the sound signal in the at least one memory, and based on identifying the predetermined acoustic signal and storing the third section of the sound signal in the at least one memory:

input the third section of the sound signal into the wake-up word verification model, obtain, as an output of the wake-up word verification model, a second probability score corresponding to the third section of the sound signal and representing a probability that the third section of the sound signal corresponds to a wake-up word, and based on the second probability score for the third section of the sound signal exceeding a fifth threshold value, execute the function corresponding to voice recognition, and wherein the fifth threshold value is smaller than the second threshold value.

8. The electronic device of claim 7, wherein the one or more instructions, when executed by the at least one processor, is further configured cause the electronic device to:

based on identifying a first plurality of sections of the sound signal respectively corresponding to a first plurality of first probability scores, among the one or more first probability scores, with values between the first threshold value and the sixth threshold value, input the first plurality of sections of the sound signal into the wake-up word verification model.

9. The electronic device of claim 7, wherein the one or more instructions, when executed by the at least one processor, further cause the electronic device to:

based on the function corresponding to voice recognition being executed based on the second probability score corresponding to the third section of the sound signal exceeding the fifth threshold value, delete the third section of the sound signal from the at least one memory, and restore the fifth threshold value to the second threshold value.

10. The electronic device of claim 1, wherein the one or more instructions, when executed by the at least one processor, further cause the electronic device to:

analyze the sound signal and obtain a noise level, and determine a degree of adjustment according to the noise level.

11. The electronic device of claim 3, wherein the one or more instructions, when executed by the at least one processor, further cause the electronic device to:

based on a predetermined time passing after the predetermined acoustic signal is identified, reverse the reduction of the first threshold value.

12. A method of controlling an electronic device, the method comprising:

inputting a sound signal received through a microphone into a wake-up word detection model;

obtaining, as an output of the wake-up word detection model, one or more first probability scores corresponding to one or more sections of the sound signal, wherein each first probability score of the one or more first probability scores represents a probability that a corresponding section of the one or more sections of the sound signal corresponds to a wake-up word;

identifying a first section of the sound signal, among the one or more sections of the sound signal, that corresponds to a first probability score, among the one or more first probability scores, that exceeds a first threshold value;

based on identifying the first section of the sound signal, inputting the first section of the sound signal into a wake-up word verification model, and obtaining, as an output of the wake-up word verification model, a second probability score corresponding to the first section of the sound signal and representing a probability that the first section of the sound signal corresponds to a wake-up word;

based on the second probability score corresponding to the first section of the sound signal exceeding a second threshold value, executing a function corresponding to voice recognition, and based on identifying a predetermined acoustic signal in the sound signal, reducing the second threshold value.

13. The method of claim 12, further comprising:

based on identifying the predetermined acoustic signal in the sound signal, reducing the first threshold value.

14. The method of claim 13, wherein the predetermined acoustic signal comprises at least one of a clapping sound or a whistle sound, and wherein the method further comprises:

inputting the sound signal into a sound event detection model;

obtaining, as an output of the sound event detection model, one or more third probability scores corresponding to one or more sections of the sound signal, wherein each third probability score of the one or more third probability scores represents a probability that a corresponding section of the one or more sections of the sound signal corresponds to the predetermined acoustic signal, and identifying as the predetermined acoustic signal a section of the sound signal, among the one or more sections of the sound signal, that corresponds to a third probability score, among the one or more third probability scores, that exceeds a third threshold value.

* * * * *